United States Patent
Misaka et al.

(10) Patent No.: US 11,092,885 B2
(45) Date of Patent: Aug. 17, 2021

(54) MANUFACTURING METHODS OF SEMICONDUCTOR DEVICES

(71) Applicant: Samsung Electronics Co., Ltd., Suwon-si (KR)

(72) Inventors: Akio Misaka, Hwaseong-si (KR); Noyoung Chung, Hwaseong-si (KR); Woonhyuk Choi, Hwaseong-si (KR)

(73) Assignee: Samsung Electronics Co., Ltd.

(*) Notice: Subject to any disclaimer, the term of this patent is extended or adjusted under 35 U.S.C. 154(b) by 0 days.

(21) Appl. No.: 16/845,459

(22) Filed: Apr. 10, 2020

(65) Prior Publication Data

US 2021/0063867 A1    Mar. 4, 2021

(30) Foreign Application Priority Data

Sep. 4, 2019   (KR) .................. 10-2019-0109625

(51) Int. Cl.
| | | |
|---|---|---|
| *G06F 30/30* | (2020.01) | |
| *G03F 1/36* | (2012.01) | |
| *G06F 30/392* | (2020.01) | |
| *G06F 30/367* | (2020.01) | |
| *G06F 30/3953* | (2020.01) | |
| *G06F 30/398* | (2020.01) | |

(52) U.S. Cl.
CPC .............. *G03F 1/36* (2013.01); *G06F 30/367* (2020.01); *G06F 30/392* (2020.01); *G06F 30/398* (2020.01); *G06F 30/3953* (2020.01)

(58) Field of Classification Search
CPC ........ G03F 1/36; G06F 30/367; G06F 30/398; G06F 30/392; G06F 30/3953
USPC .......................................................... 716/53
See application file for complete search history.

(56) References Cited

U.S. PATENT DOCUMENTS

| | | | | |
|---|---|---|---|---|
| 7,065,738 | B1 * | 6/2006 | Kim .......................... | G03F 1/36 716/53 |
| 7,353,493 | B2 * | 4/2008 | Akiyama .................. | G03F 1/36 716/53 |
| 7,355,673 | B2 | 4/2008 | Hsu et al. | |
| 7,581,197 | B2 * | 8/2009 | Arunachalam ....... | G06F 30/392 716/119 |

(Continued)

FOREIGN PATENT DOCUMENTS

| | | |
|---|---|---|
| KR | 1020100127671 | 12/2010 |
| KR | 10-1095062 | 12/2011 |

OTHER PUBLICATIONS

Seung Weon Paek et al., Enhanced Layout Optimization of Sub-45nm Standard, Memory Cells and its Effects, Proc. of SPIE, vol. 7275-71, Samsung Electronics, Korea, 9 pages.

*Primary Examiner* — Jack Chiang
*Assistant Examiner* — Brandon Bowers
(74) *Attorney, Agent, or Firm* — Myers Bigel, P.A.

(57) ABSTRACT

A method of manufacturing a semiconductor device includes randomly placing a plurality of standard cells from a library in which the standard cells are pre-stored, designing an interconnection pattern in which the standard cells are connected randomly to each other, connecting the standard cells according to the interconnection pattern to generate a virtual layout, performing an optical proximity correction operation on the virtual layout using an optical proximity correction (OPC) model, and forming and verifying a mask corresponding to the virtual layout on which the optical proximity correction operation is performed.

18 Claims, 12 Drawing Sheets

(56) References Cited

U.S. PATENT DOCUMENTS

| | | |
|---|---|---|
| 8,739,078 B2 | 5/2014 | Landis |
| 8,856,695 B1 | 10/2014 | Chang et al. |
| 8,877,650 B2 | 11/2014 | Park et al. |
| 9,547,745 B1* | 1/2017 | Juang .................... G06F 30/398 |
| 9,892,221 B2 | 2/2018 | Wu et al. |
| 2005/0280800 A1* | 12/2005 | Laiding .................... G03F 1/36 |
| | | 355/77 |
| 2009/0031262 A1 | 1/2009 | Maeda et al. |
| 2010/0251202 A1* | 9/2010 | Pierrat .................... G06F 30/30 |
| | | 716/50 |
| 2011/0029937 A1* | 2/2011 | Kodera .............. G03F 7/70441 |
| | | 716/52 |
| 2019/0004418 A1 | 1/2019 | Jeong |

* cited by examiner

MANUFACTURING METHODS OF SEMICONDUCTOR DEVICES

CROSS-REFERENCE TO RELATED APPLICATION

This application claims benefit of priority to Korean Patent Application No. 10-2019-0109625 filed on Sep. 4, 2019, in the Korean Intellectual Property Office, the disclosure of which is incorporated by reference herein in its entirety.

BACKGROUND

The present disclosure relates to methods of manufacturing semiconductor devices.

Processes of manufacturing semiconductor devices may include a photolithography process that use one or more masks to form patterns on semiconductor substrates such as wafers or the like. Operations in forming a mask to be used to form a desired pattern may include layout design, optical proximity correction (OPC), mask tape out (MTO), mask data preparation, and the like. The optical proximity correction may be included in the forming process as a method to address an optical proximity effect (OPE) caused by influences between patterns in a photolithography process.

SUMMARY

Aspects of the present disclosure provide methods of manufacturing semiconductor devices having improved productivity through pre-verifying an optical proximity correction model and a mask using a virtual layout that is created by randomly placing and routing standard cells, and then modifying/supplementing a layout of the standard cells and/or the optical proximity correction model based on a result of a verification operation performed on the virtual layout.

According to some example embodiments, a method of manufacturing a semiconductor device may include randomly placing a plurality of standard cells from a library in which the standard cells are pre-stored, designing an interconnection pattern in which the standard cells are connected randomly to each other, connecting the standard cells according to the interconnection pattern to generate a virtual layout, performing an optical proximity correction operation on the virtual layout using an optical proximity correction (OPC) model, and forming and verifying a mask corresponding to the virtual layout on which the optical proximity correction operation is performed.

According to some example embodiments, a method of manufacturing a semiconductor device includes randomly placing and routing standard cells to generate a virtual layout corresponding to a virtual integrated circuit (IC) block, performing an optical proximity correction on the virtual layout using an optical proximity correction model, modifying at least one of the optical proximity correction model and/or a layout of one of the randomly placed and routed standard cells based on a verification result of a mask corresponding to the virtual layout, placing and routing at least a portion of the standard cells based on a design rule to generate an actual layout corresponding to an IC block, performing an optical proximity correction on the actual layout using the optical proximity correction model, forming a mask corresponding to the actual layout on which the optical proximity correction is performed, and performing a semiconductor process on a wafer using the mask corresponding to the actual layout.

According to some example embodiments, a method of manufacturing a semiconductor device includes randomly placing and routing all standard cells, stored in a standard cell library, to generate a virtual layout in which the standard cells are placed and connected resulting in M combinations of standard cells adjacent to each other, where M is a natural number, verifying mask data, generated from the virtual layout, to modify at least one layout among layouts of the standard cells, placing and routing at least a portion of the standard cells based on a design rule to generate an actual layout in which the standard cells are placed and connected, resulting in N combinations of standard cells adjacent to each other, where N is a natural number less than M, and forming a mask corresponding to the actual layout to perform a semiconductor process.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Hereinafter, some example embodiments will be described with reference to the accompanying drawings.

Figure 1:
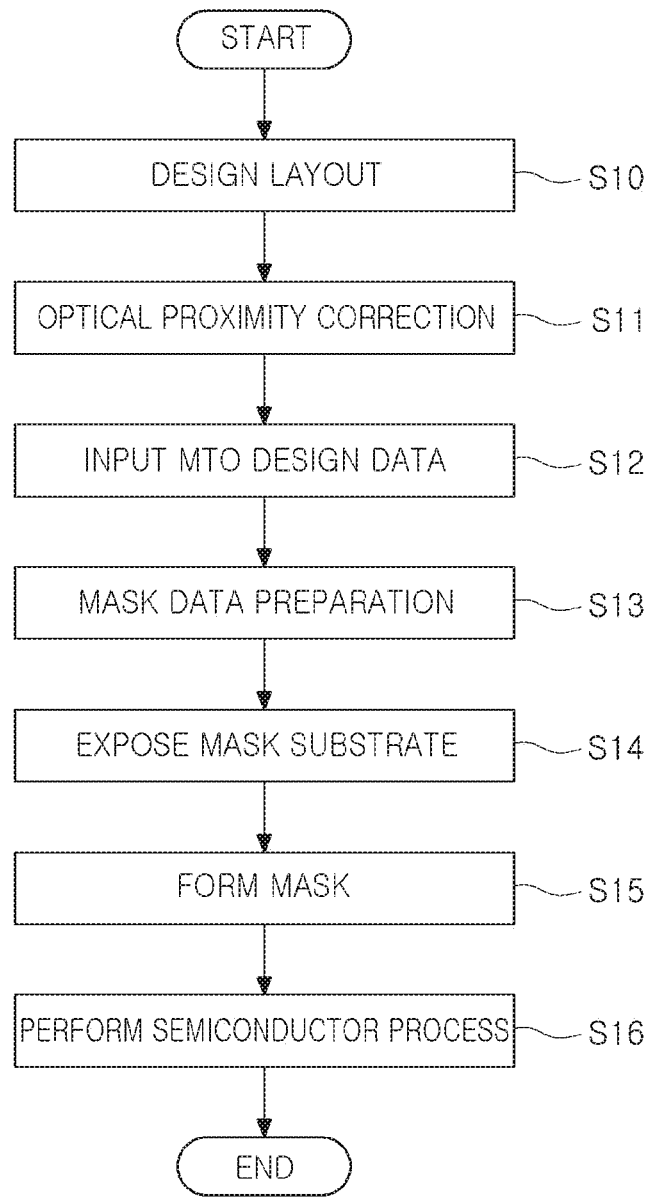
FIGS. 1 and 2 illustrate a method of manufacturing semiconductor devices according to some example embodiments.
Figure 2:
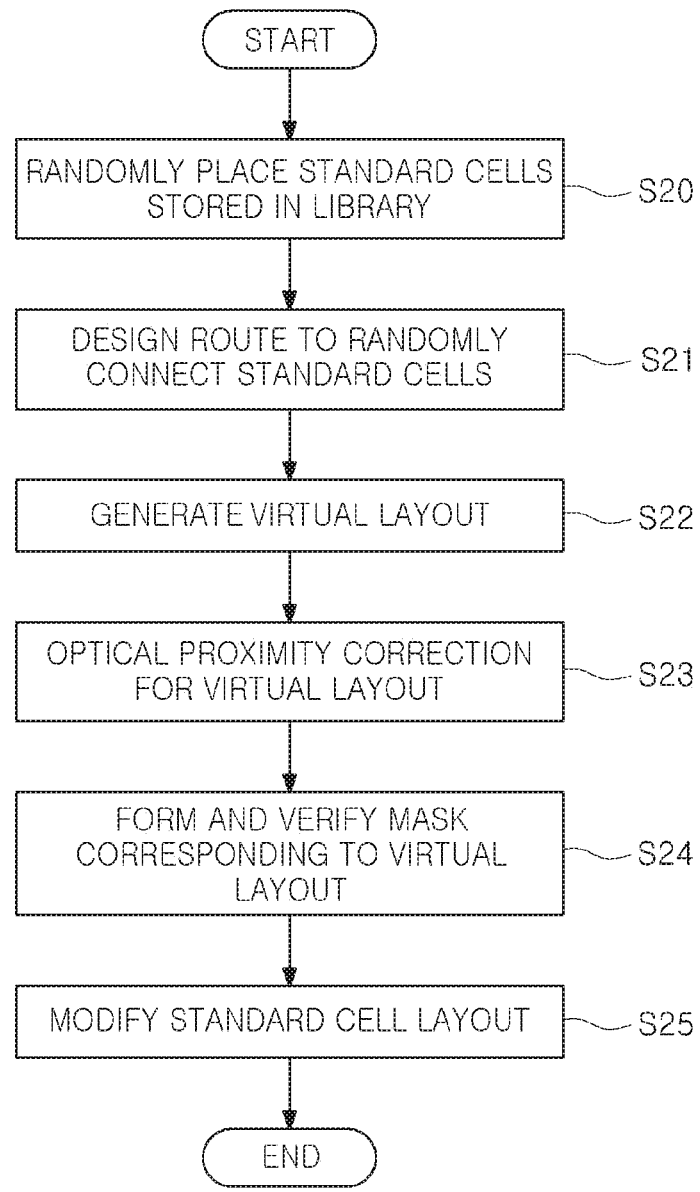

FIGS. 1 and 2 illustrate a method of manufacturing a semiconductor device according to some example embodiments.

Referring to FIG. 1, a method of manufacturing semiconductor devices according to some example embodiments may start with designing a layout of a semiconductor device (S10). The designing a layout of a semiconductor device may be performed by placing and routing standard cells, where the standard cells were already stored in a library prior to the start of the designing of the semiconductor device.

In some example embodiments, a layout may be manually designed by a full-customer layout method in which a design technician or engineer personally designs elements such as a transistor, a resistor, a capacitor, and the like, included in a design circuit. Alternatively, in some example embodiments, a layout may be automatically designed by a computer system using a circuit-based layout tool or an automatic P&R tool for automatically placing and routing standard cells. The computer system may use information of a design circuit to automatically design the layout.

Standard cells may provide a unit circuit for implementing a design circuit. For example, some of the standard cells may provide a logic circuit such as an OR gate, an AND gate, or the like. Some of the standard cells may provide a storage element such as an SRAM or the like. When the layout design is completed, layout data may be provided as data having a graphic design system (GDS) format or a GDS II format.

When the layout data is generated, a design rule check (DRC) may be performed on the layout data. A design rule may be defined based on a process of fabricating a semiconductor device. As an example, a minimum gap between patterns, a minimum width of a pattern, or the like, may be defined by a design rule. In addition, a layout versus schematic (LVS) may be performed to verify whether the layout data matches a design circuit.

When the layout design is completed and the layout data is confirmed, optical proximity correction (OPC) may be performed on the layout data (S11). The optical proximity correction is a process in which the layout data may be modified/supplemented to compensate for one or more errors resulting from an optical proximity effect (OPE), and may be performed based on an optical proximity correction model.

When the optical proximity correction is completed, mask tape-out (MTO) design data may be input (S12). The MTO design data may be mask design data. The optical proximity correction may be completed on the MTO design data, and may be provided as data having a GDS format, a GDS II format, or an open artwork system interchange standard (OASIS) format.

When the MTO design data is input, mask data preparation (MDP) may be performed (S13). The mask data preparation may include format conversion, addition of a standard mask patterns for inspection, automatic and manual verification, and the like. For example, during a format conversion process, the MTO design data may be divided by areas to be converted into a format for exposure equipment. One or more errors, which may occur in a photolithography process, may be corrected during the format conversion process.

When the mask data is prepared, a mask substrate may be exposed using the mask data (S14). Exposure equipment having various specifications may be used when the mask substrate is exposed. In some example embodiments, a process of converting the mask data into pixel data may be performed before a photolithography process is performed. The pixel data may be data directly used in an actual photolithography process, and may include data on a shape of an exposure target.

When the exposure is completed, a mask may be formed (S15). A process of forming the mask using a fully exposed mask substrate may include processes such as development, etching, and cleaning. When the fabrication of the mask is completed, a semiconductor process may be performed to form patterns on a semiconductor substrate, such as a wafer or the like, using the mask (S16).

If the layout design and/or the optical proximity correction is not appropriately performed in the series of processes described with reference to FIG. 1, patterns may not be appropriately formed in the mask by mask design data and mask data. As an example, there may be issues such as connection of patterns adjacent to each other, or separation of a pattern that should be continuously formed.

To precisely form a mask having a desired pattern, the mask design data needs to be modified/supplemented during the mask data preparation and the like. To modify/supplement the mask design data, the layout or the optical proximity correction model needs to be modified. An extended period of time may be required to modify the layout or the optical proximity correction model, which may cause significant damage to business.

In some example embodiments according to the present disclosure, standard cells may be randomly placed and routed to generate a virtual layout, and a mask corresponding to the virtual layout may be formed in advance and verified. A layout of the standard cells and/or an optical proximity correction model may be modified/supplemented using a verification result of the mask corresponding to the virtual layout.

In a virtual layout in which standard cells are randomly placed and routed, the standard cells may be placed in more various combinations than in an actual layout for manufacturing a semiconductor device. Thus, the layout of the standard cells and/or the optical proximity correction model may be modified/supplemented based on the mask corresponding to the virtual layout to significantly reduce a possibility that issues occur in an actual layout design and during a mask fabrication process.

A method of modifying a layout of standard cells using a virtual layout will be described with reference to FIG. 2. Referring to FIG. 2, standard cells stored in a library may be randomly placed (S20). In some example embodiments, in operation S20, all of the standard cells stored in the library may be randomly placed. Accordingly, the standard cells may be placed in more various combinations than in an actual layout in which standard cells stored in a library are not all used.

When the standard cells are randomly placed, a route may be designed to randomly connect the standard cells (S21). As an example, the route design may be performed by arranging power lines and signal lines. The locations and numbers of the power lines and signal lines are determined depending on a size and a place of standard cells. The power lines and signal lines may be isolated in a plurality of cut locations. In some example embodiments, the cut locations may be randomly determined to design a route for randomly connecting the standard cells.

Next, the standard cells and the route may be connected to generate a virtual layout (S22). Since both the place and the route of the standard cells are randomly performed, the standard cells may be placed and connected in various combinations in the virtual layout. The virtual layout is a layout generated by randomly placing and routing the standard cells with no consideration for an operation thereof. Accordingly, when a virtual IC block corresponding to the virtual layout is actually manufactured, the virtual IC block may not operate normally.

When the virtual layout is generated, an optical proximity correction operation may be performed on the virtual layout (S23). As described above, the optical proximity correction operation may be an operation in which layout data is corrected by compensating for an error that may be caused by an optical proximity effect. Data of the virtual layout may be corrected by the optical proximity correction operation.

When the optical proximity correction operation is completed, a mask corresponding to the virtual layout may be formed and verified (S24). Similarly to the procedure described with reference to FIG. 1, mask data may be prepared by performing the optical proximity correction on mask data, generated based on the virtual layout, and receiving MTO design data. For example, in some example embodiments, the virtual layout may be designed and the mask corresponding to the virtual layout may be formed in the same manner as the processes of designing an actual layout and forming a mask corresponding to the actual layout.

The process of forming and verifying the mask may include a process in which the mask is virtually verified by simulating a photolithography process using mask data corresponding to the virtual layout. Alternatively, the process of forming and verifying the mask may include a process in which a mask corresponding to a virtual layout is actually formed and a photolithography process is performed on a wafer substrate to verify patterns formed on the wafer.

A result of verifying the mask may be used to modify/supplement the layout of the standard cells (S25). When there is a standard cell determined to have a high possibility that an issue may occur during the verification process using the mask corresponding to the virtual layout, the layout of the standard cell may be modified to reduce a possibility that an issue may occur during an actual fabrication process. Alternatively, an optical proximity correction model applied to an actual fabrication process may be modified/supplemented, and/or a design rule may be modified.

Figure 3:
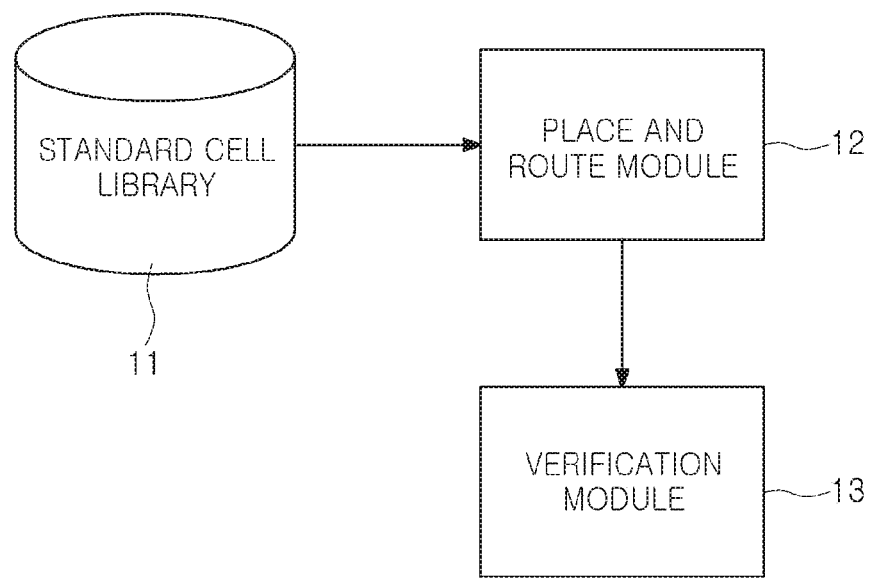
FIG. 3 is provided to illustrate a method of manufacturing a semiconductor device.

FIG. 3 is provided to illustrate a method of manufacturing a semiconductor device.

Referring to FIG. 3, a module 10 configured to implement a method of manufacturing a semiconductor device according to an example embodiment may include a standard cell library 11, a place and route module 12, and a verification module 13, and the like. Each of the standard cell library 11, the place and route module 12, and the verification module 13 may be implemented as a software module executable in a computer system, although the present disclosure is not limited thereto.

The standard cell library 11 may be a type of database storing a layout of each of the standard cells required for layout design to produce an actual semiconductor device. A layout size of each of the standard cells stored in the standard cell library 11 may follow a design rule. For example, each of the standard cells may include an active region, a gate, a contact, and input/output pins.

The place and route module 12 may be a module configured to perform a function of placing and connecting the standard cells stored in the standard cell library 11. In some example embodiments, the place and route module 12 may randomly place and route standard cells using all of the standard cells stored in the standard cell library 11 to generate a virtual layout. Unlike an actual layout, the virtual layout may not correspond to a design circuit configured to perform a specific function. For example, even when a semiconductor process is performed based on a virtual layout, a design circuit configured to a specific function may not be implemented.

The verification module 13 may be a module configured to form and verify a mask corresponding to the virtual layout generated by the place and route module 12. The verification module 13 may perform an optical proximity correction operation on the virtual layout prior to fabrication and verification of the mask corresponding to the virtual layout. The verification module 13 may verify a mask corresponding to the virtual layout by performing a virtual simulation of the photolithography process using the mask corresponding to the virtual layout. Additionally or alternatively, the verification module 13 may verify the mask corresponding to the virtual layout by actually forming a mask corresponding to the virtual layout and forming a pattern on a semiconductor substrate such as a wafer, or the like, using the mask. In the latter case, the verification module 13 may operate in conjunction with exposure equipment configured to perform a photolithography process.

A verification result output by the verification module 13 may be used to modify/supplement the layout of the standard cells stored in the standard cell library 11. As an example, when the mask corresponding to the virtual layout is verified, it may be determined that a pattern is not precisely formed in an area in which specific standard cells are disposed. In this case, the layout of the corresponding standard cells may be modified.

Additionally or alternatively, the verification result output by the verification module 13 may be used to modify an optical proximity correction model applied to a layout. An optical proximity model for a layout expected to have a significant optical proximity effect may be optimized using the virtual layout to secure an optical proximity correction model in advance. Alternatively, a portion of design rules determining the placing and routing of the standard cells in the actual layout may be modified based on the verification result.

Figure 4:
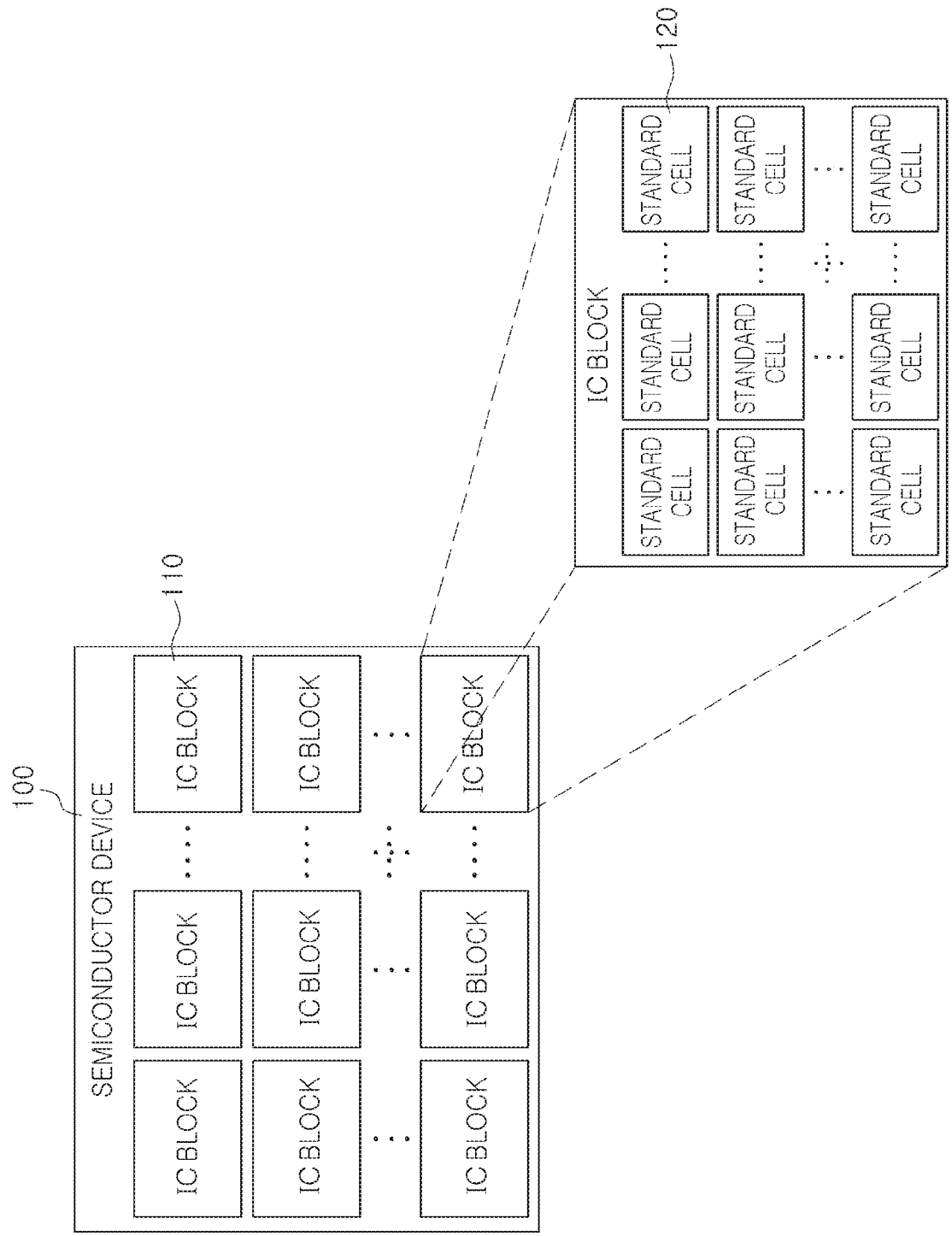
FIG. 4 illustrates a semiconductor device according to some example embodiments.

FIG. 4 illustrates a semiconductor device according to some example embodiments.

Referring to FIG. 4, the semiconductor device 100 according to some example embodiments may include a plurality of integrated circuit (IC) blocks 110. The IC blocks 110 may be connected to each other by a wiring formed of a conductive material. According to some example embodiments, the IC blocks 110 may provide a power supply voltage generation circuit, a clock generation circuit, an interface circuit, a page buffer circuit, a sampling circuit, and the like. The type and number of circuits provided by the IC blocks 110 may vary depending on the semiconductor device 100.

Each of the IC blocks 110 may include a plurality of standard cells 120. A function provided by each of the IC blocks 110 may be determined by selecting at least a portion of the standard cells 120 stored in the library and placing and routing the standard cells 120 depending on a design circuit and a design rule prepared in advance. Accordingly, types and placement forms of the standard cells 120 included in at least a portion of the IC blocks 110 included in one semiconductor device 100 may be different from each other.

The standard cell 120 may be a unit of a layout for implementing each of the IC blocks 110 and may have a structure following on a design rule. For example, the standard cell 120 may include one or more gate electrodes extending in a first direction and isolated from each other in a second direction intersecting the first direction. In addition, the standard cell 120 may include at least one active region intersecting the gate electrode. As an example, the active region may be provided by one or more fin structures extending in the second direction and isolated from each other in the first direction. The active region may provide a source/drain region, and a location of a contact, connected to the gate electrode and the source/drain region, may be defined in a standard cell SC. According to some example embodiments, locations of a via and a portion of metal interconnection connected to the contact may also be defined in the standard cell SC.

In general, a layout design method of the semiconductor device 100 may include an operation of placing and routing the standard cells 120 and IC blocks 110 to design a layout, an operation of verifying the designed layout, and the like. A design rule manual (DRM), a design kit, and the like, providing a design rule needed to design the layout may be used in the operation of designing the layout. The design rule manual and the design kit may be determined by a manufacturing process of producing a semiconductor device 100.

When the designing of the layout is complete, an optical proximity correction operation may be performed on the layout to modify/supplement the layout. The optical proximity correction operation may vary depending on patterns included in the layout. Accordingly, when a layout of the IC blocks 110 and/or the semiconductor device 100 is changed, the optical proximity correction operation should be newly performed. For example, when it is determined that the layout or the optical proximity correction model needs to be modified/supplemented in the operation of the mask data preparation, or the like, the optical proximity correction operation should be performed again together with modification of the layout. Therefore, total time may be increased.

In some example embodiments, the standard cells 120 may be randomly placed and routed to generate a virtual layout, and an optical proximity correction operation may be performed to form a mask corresponding to the virtual layout. By simulating a photolithography process based on a mask corresponding to the virtual layout and/or actually forming a mask corresponding to the virtual layout, patterns may be formed on a wafer to verify the mask for the virtual layout. A verification result may be used to determine accuracy and reliability of the optical proximity correction, applied to the virtual layout, and to modify/supplement the layout of the standard cells and/or the optical proximity correction model.

In the virtual layout, the standard cells 120 may be placed and routed in more types of combination than in an actual layout created to actually produce the semiconductor device 100. Accordingly, most of the places and routes of the standard cells 120 expected to appear in the actual layout may be covered with the virtual layout. As a result, the modified/supplemented optical proximity correction model may be applied to the actual layout according to the verification result of the mask corresponding to the virtual layout to improve the accuracy of the optical proximity correction. In addition, when it is determined that the optical proximity correction model needs to be modified during an actual production process of the semiconductor device 100, a verification result of the mask corresponding to the virtual layout may be used. Therefore, time delay may be significantly reduced.

In some example embodiments, the layout of the standard cells may be modified/supplemented based on the verification result of the mask corresponding to the virtual layout. As an example, the layout of the standard cells may be modified/supplemented to significantly reduce an issue occurring in mask data generated after the optical proximity correction is completed. Also, in some example embodiments, the layout of the standard cells may be modified/supplemented to omit optical proximity correction in the actual layout or to reduce time required to perform optical proximity correction on the actual layout. Thus, development time may be reduced and productivity may be improved.

Figure 5:
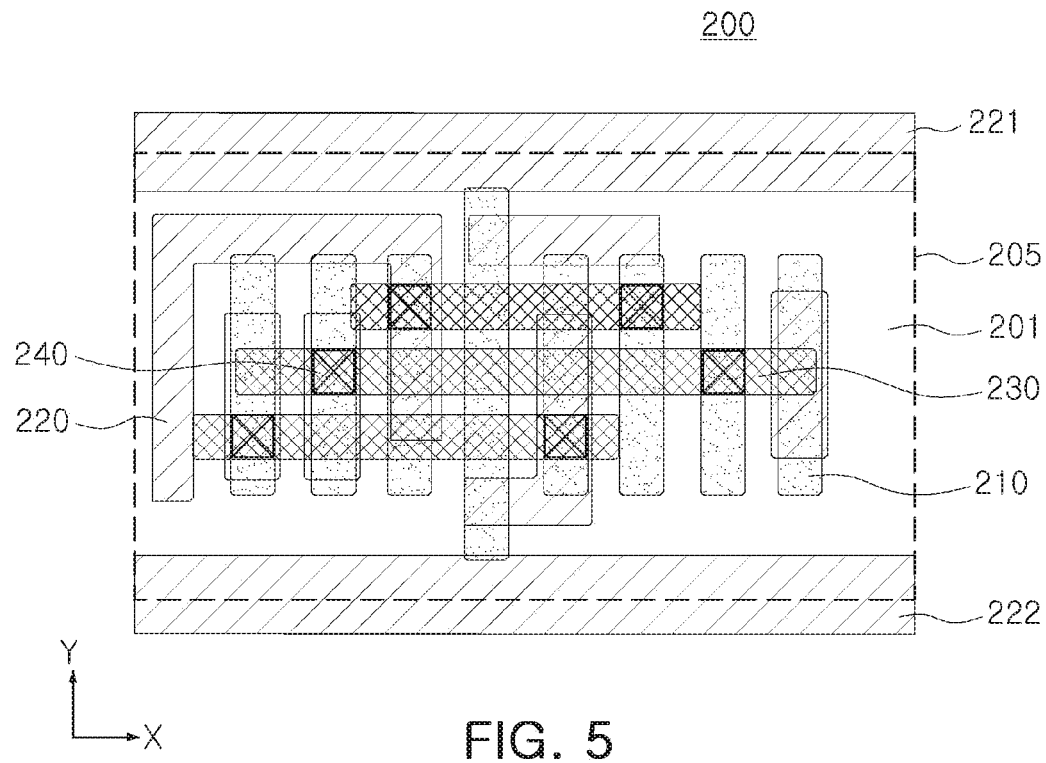
FIGS. 5 and 6 illustrate standard cells applicable to a method of manufacturing semiconductor devices according to some example embodiments.
Figure 6:
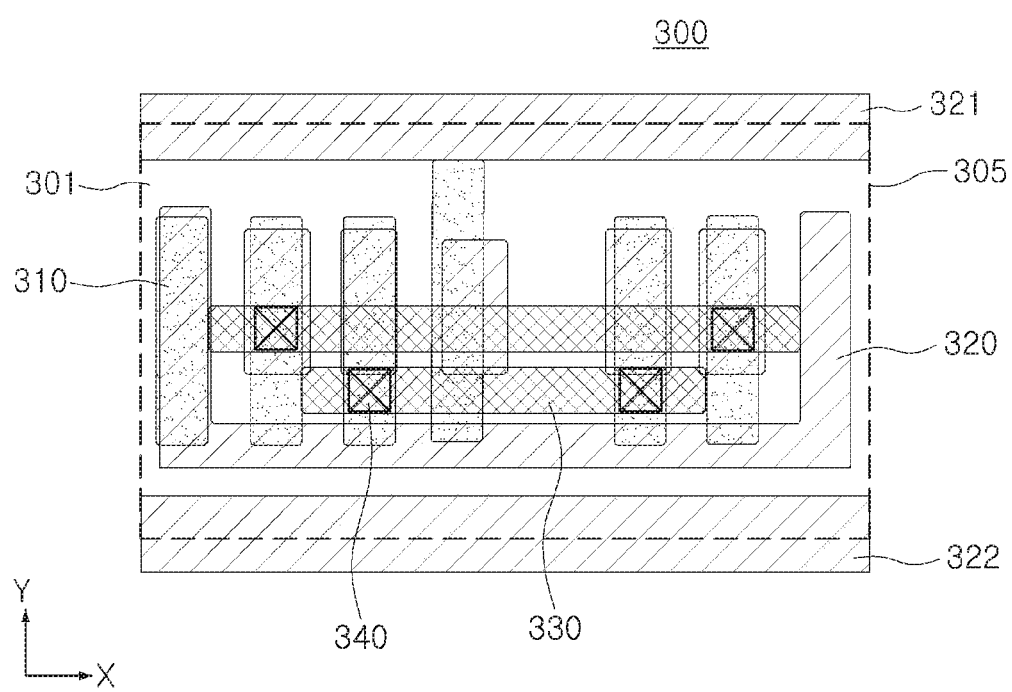

FIGS. 5 and 6 illustrate standard cells applicable to a method of manufacturing semiconductor devices according to some example embodiments.

Referring to FIG. 5, a standard cell 200 according to some example embodiments may include a plurality of components formed in the semiconductor substrate 201 and may be defined in a unit region 205. The standard cell 200 according to the example embodiment illustrated in FIG. 5 may include active regions 210, a plurality of lower interconnections 220, 221, 222, and 230, and vias 240. The standard cells 200 may further include gate electrodes. A first power supply line 221 for supplying a first power supply voltage and a second power supply line 222 for supplying a second power supply voltage may be arranged in respective upper and lower boundaries of the unit region 205.

Referring to FIG. 6, a standard cell 300 according to some example embodiments may include a plurality of components formed in the semiconductor substrate 301 and may be defined in a unit region 305. The standard cell 300 according to the example embodiment illustrated in FIG. 6 may include active regions 310, a plurality of lower interconnections 320, 321, 322, and 330, and vias 340. The standard cells 300 may further include gate electrodes. A first power supply line 321 for supplying a first power supply voltage and a second power supply line 322 for supplying a second power supply voltage may be arranged in respective upper and lower boundaries of the unit region 305

The standard cells 200 and 300 according to the example embodiments illustrated in FIGS. 5 and 6 may be defined in unit regions 205 and 305 having different sizes to each other, respectively. However, heights of the unit regions 205 and 305 may be equal to each other. Accordingly, when the standard cells 200 and 300 are arranged in a first direction (an X-axis direction) and a second direction (a Y-axis direction) to design an IC block, the first power supply lines 221 and 321 and the second power supply lines 222 and 322 may have a shape of line extending in the first direction. Signal lines, extending in the first direction, may be disposed between the first power supply lines 221 and 321 and the second power supply lines 222 and 322.

Figure 7:
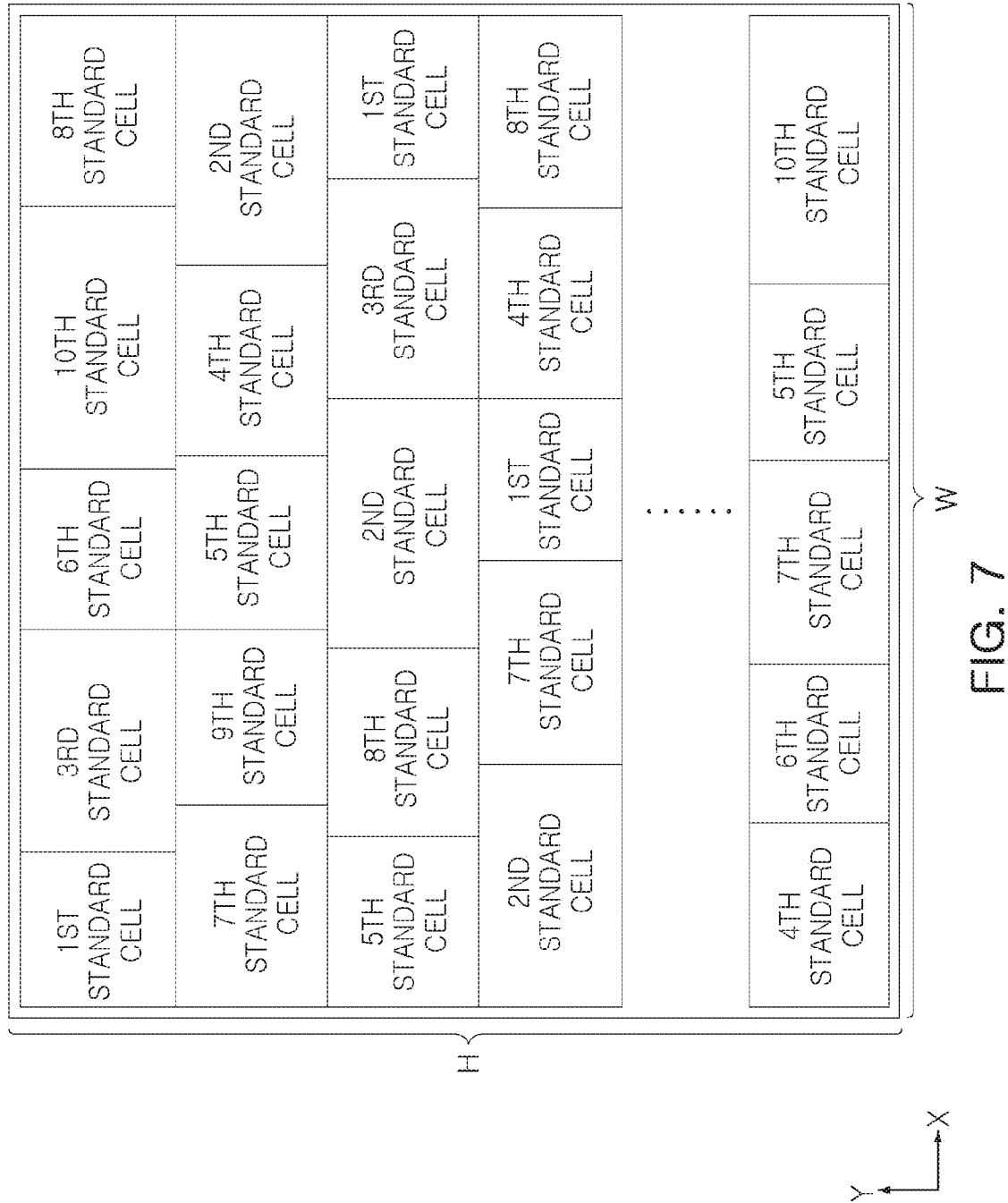
FIGS. 7 and 8 illustrate a virtual layout generated in a method of manufacturing semiconductor devices according to some example embodiments.
Figure 8:
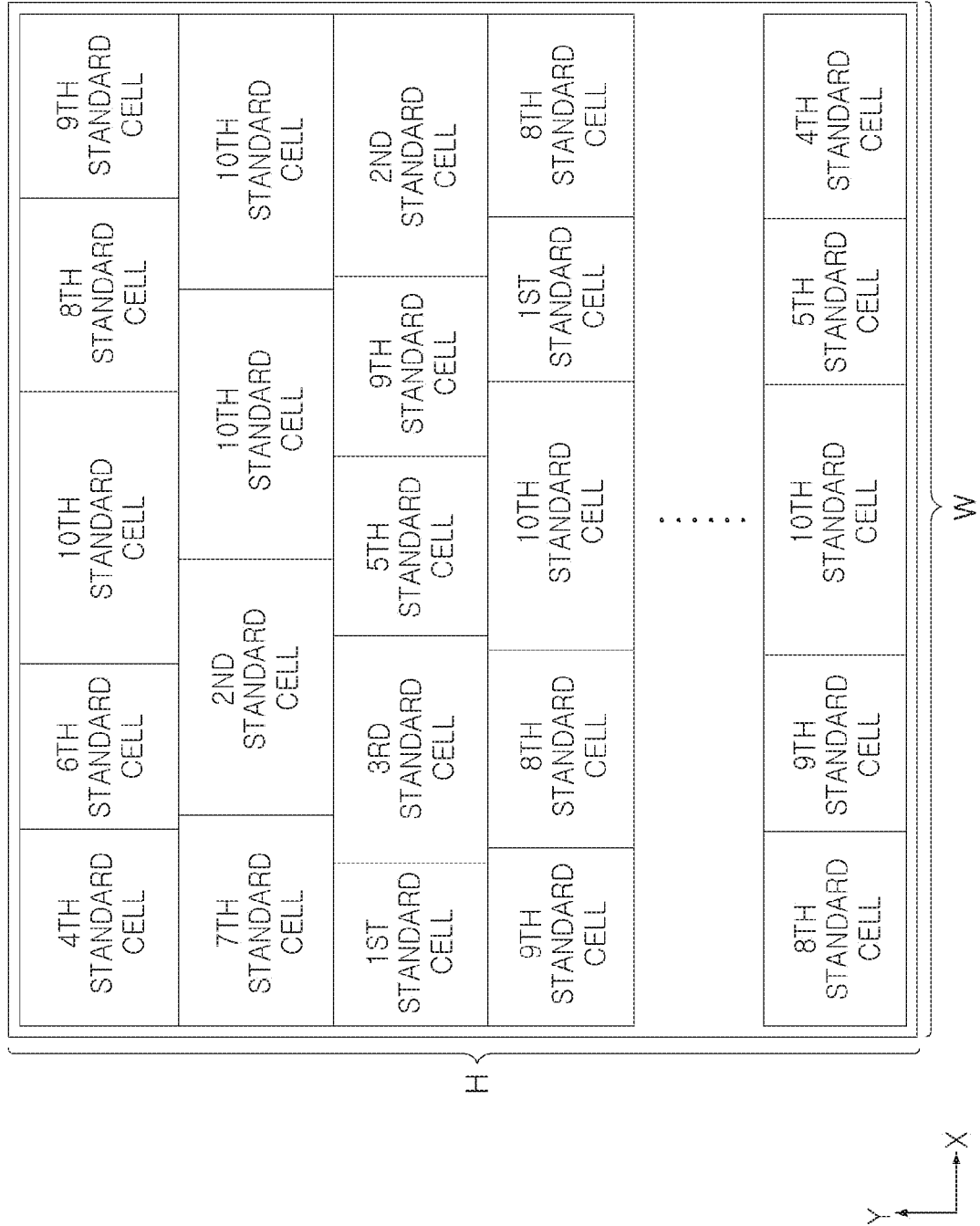

FIGS. 7 and 8 illustrate a virtual layout generated in a method of manufacturing a semiconductor device according to some example embodiments.

Referring to FIG. 7, a virtual layout 400 corresponding to an IC block having a predetermined width W and a predetermined height H may be generated. Standard cells may be randomly placed in a virtual layout 400. In the example embodiment illustrated in FIG. 7, it is assumed that there are ten (10) standard cells stored in a library, and that the virtual layout 400 is generated using all ten of the standard cells.

In the virtual layout 400, the standard cells may not be placed according to a special rule, a design circuit, a design rule, or the like, and may be randomly placed. Therefore, when the IC block is actually manufactured using the virtual layout 400, the IC block may not operate.

As necessary, two or more virtual layouts 400 and 400A may be generated by placing the standard cells in different manners to each other. In the virtual layout 400A according to the example embodiment illustrated in FIG. 8, the standard cells may be placed in a different manner than the standard cells placed in the virtual layout 400 according to the example embodiment illustrated in FIG. 7. A plurality of virtual layouts 400 and 400A, in which the standard cells are placed in different manners than each other, may be generated to modify/supplement a layout and/or an optical proximity correction model of the standard cells in consideration of various cases which may occur during an actual layout design process.

Since the standard cells are randomly disposed in the virtual layouts 400 and 400A, there may be significantly various combinations of standard cells adjacent to each other in a first direction (an X-axis direction) or a second direction (a Y-axis direction) than in an actual layout. Thus, a small number of virtual layouts 400 and 400A may cover various cases which may occur during a process of designing a great number of actual layouts.

As described above, the standard cells may be placed in the first direction (the X-axis direction) and the second direction (the Y-axis direction), and the respective standard cells may have the same height in the second direction. In some example embodiments, power supply lines may be provided along upper and lower boundaries, extending in the first direction, among boundaries between the standard cells. In addition, signal lines may be provided between the power supply lines. Hereinafter, this will be described in further detail with reference to FIGS. 9 to 11.

Figure 9:
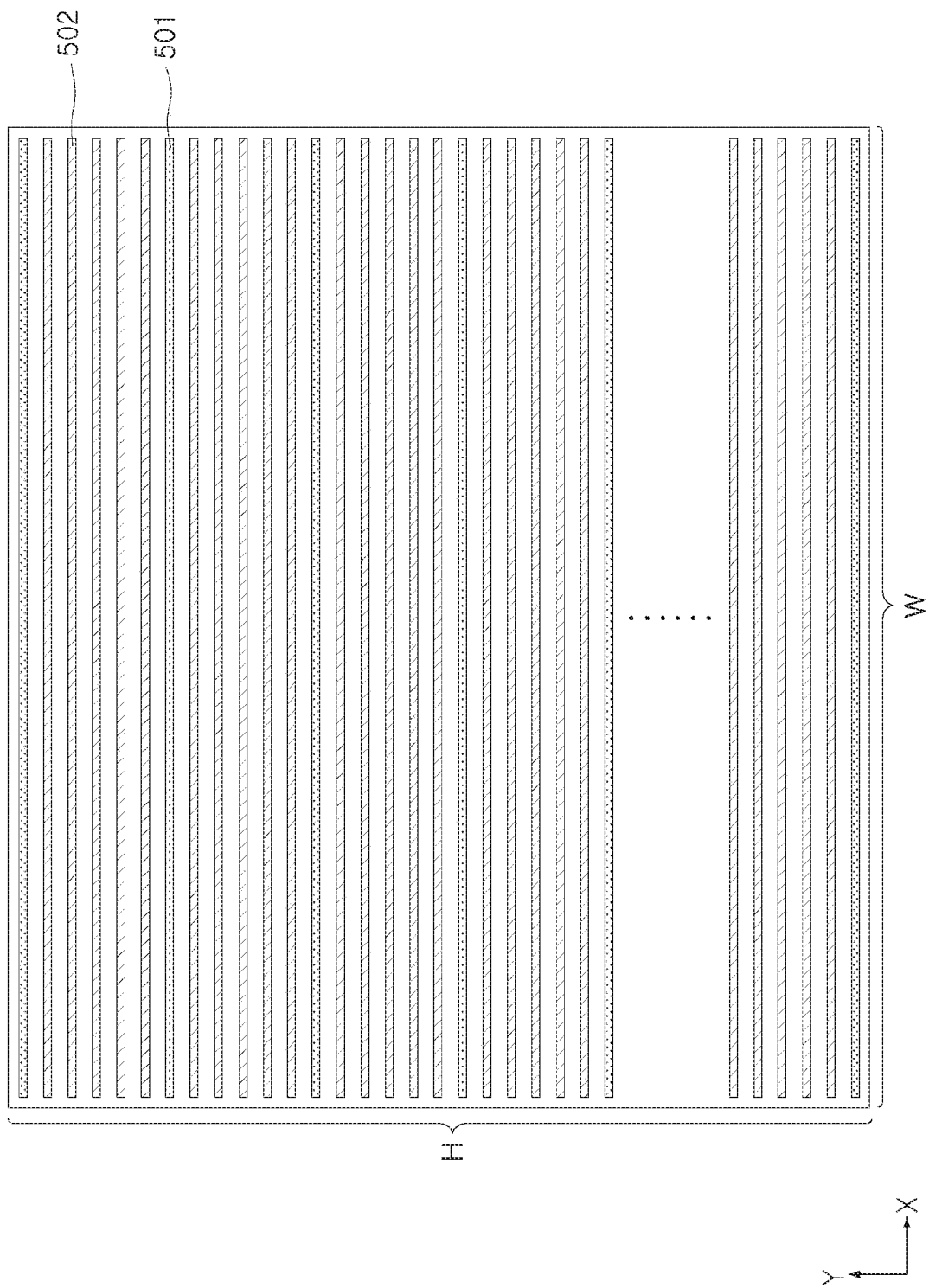
FIGS. 9 to 11 are provided to illustrate a routing method of a method of manufacturing semiconductor devices according to some example embodiments.
Figure 10:
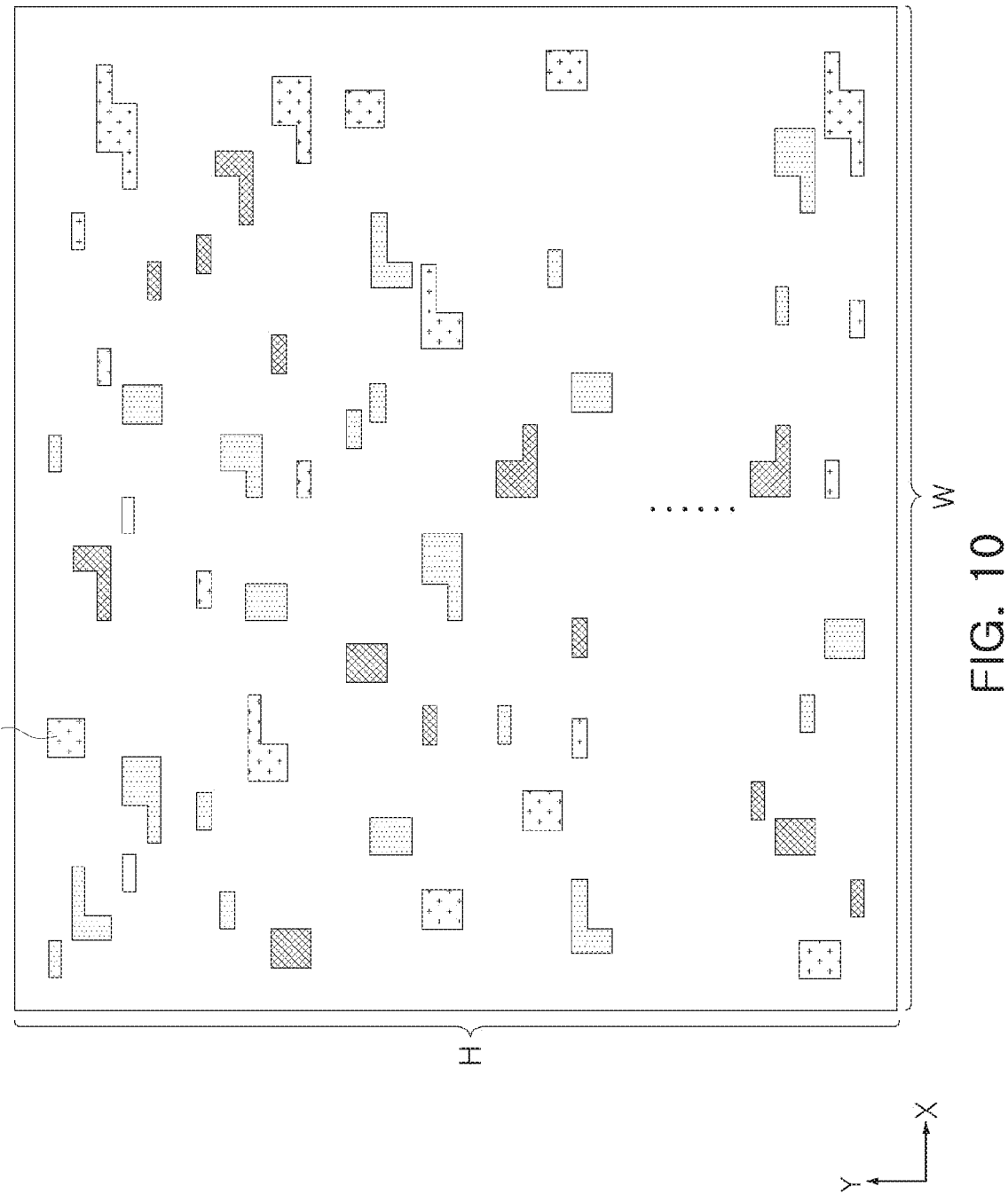
Figure 11:
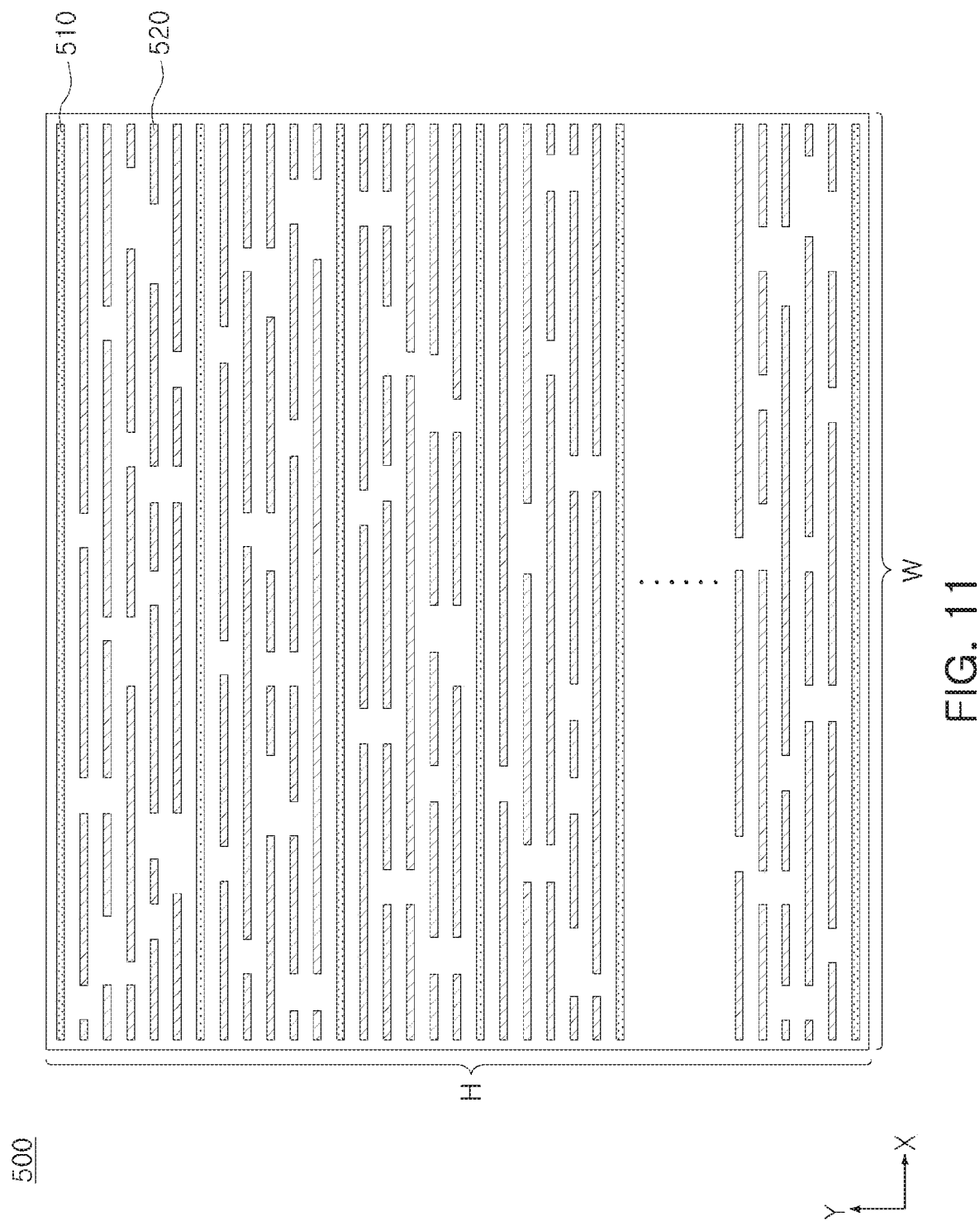

FIGS. 9 to 11 are provided to illustrate a routing method of a method of manufacturing a semiconductor device according to some example embodiments.

Referring to FIG. 9, a plurality of interconnection lines 501 and 502 extending in a first direction and arranged in a second direction may be formed. The interconnection lines 501 and 502 may include first interconnection lines 501 and second interconnection lines 502. The first interconnection lines 501 may correspond to power supply lines, and the second interconnection lines 502 may correspond to signal lines.

Referring to FIG. 10, a plurality of cut locations 503 for isolating power supply lines 501 and signal lines 502 may be determined. As an example, a virtual layout generated by randomly placing and routing a plurality of standard cells may be expressed as graphic data such as a GDS, or the like. The plurality of cut locations 503 may be generated by pixel patterns formed randomly.

The interconnection lines 501 and 502, generated randomly, may be divided using the cut locations 503 and 502 to form interconnection patterns 510 and 520 illustrated in FIG. 11. The interconnection patterns 510 and 520 may be connected to standard cells, randomly placed, as described above with reference to FIGS. 7 and 8. As a result, a virtual layout in which the standard cells are randomly placed and routed may be generated. The interconnection patterns 510 and 520 may be connected to lower interconnections included in each of the standard cells.

When the virtual layout is generated, optical proximity correction may be performed on the virtual layout using an optical proximity correction model. Then, a mask corresponding to the virtual layout, on which optical proximity correction is completed, may be fabricated. The mask may be verified through simulation and/or an actual process.

A verification result of the mask may be used to modify/supplement the layout of the standard cells, or to modify/supplement an optical proximity correction model. For example, sizes, positions, and the like, of at least a portion of interconnections included in the standard cells may be modified based on the verification result of the mask. Alternatively, the verification result of the mask may also be used to modify operating parameters, or the like, of apparatuses for use in an actual process of producing a semiconductor device.

Figure 12:
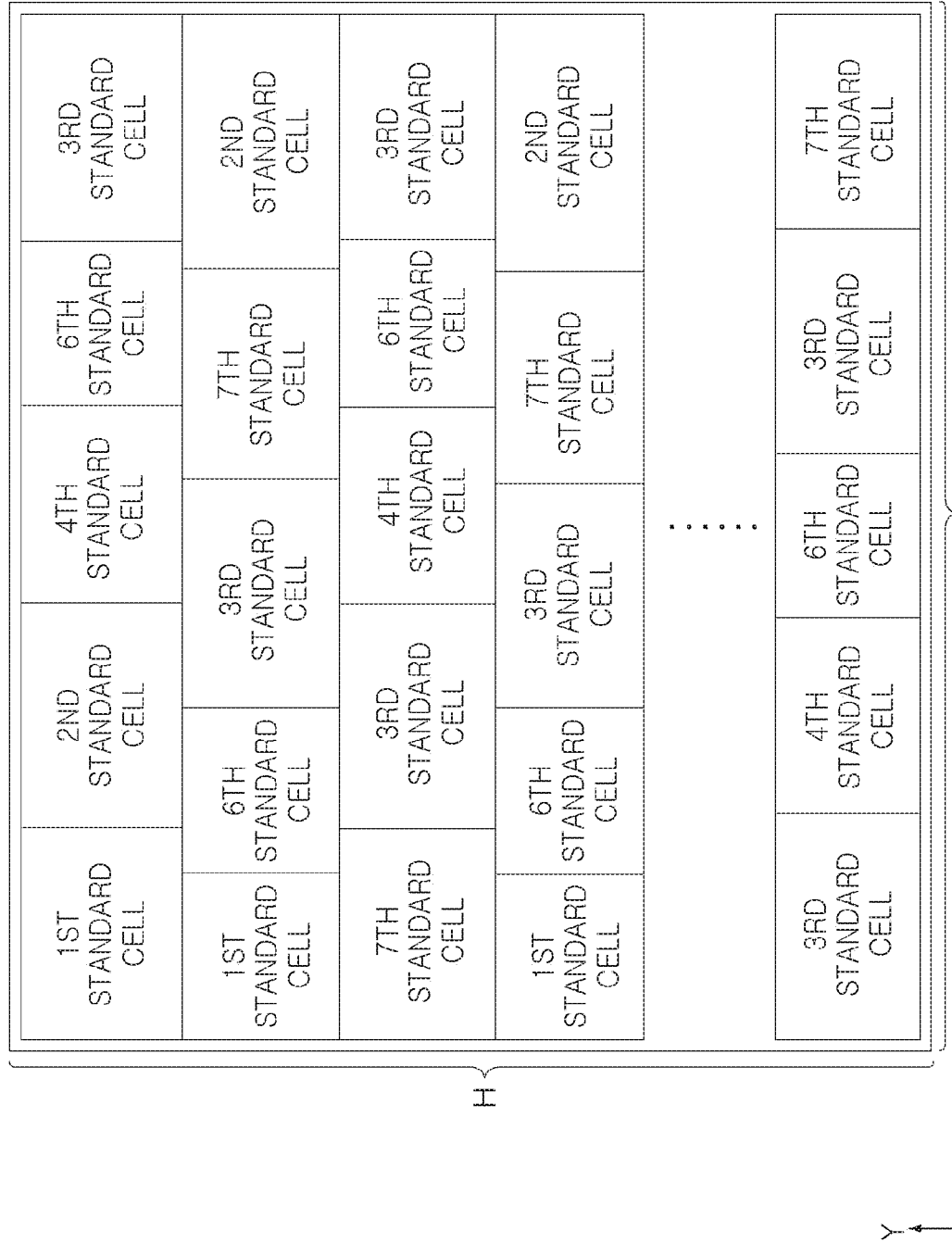
FIG. 12 illustrates an actual layout generated in a method of manufacturing a semiconductor devices according to some example embodiments.

FIG. 12 illustrates an actual layout generated in a method of manufacturing a semiconductor device according to some example embodiments.

Referring to FIG. 12, an actual layout 600 may be generated by placing at least a portion of standard cells according to a design circuit prepared in advance. In some example embodiments, the actual layout 600 may include only a portion of standard cells stored in a library. Moreover, since the standard cells may be placed depending on a design rule, the number of combinations of standard cells adjacent to each other in at least one of a first direction (an X-axis direction) and a second direction (a Y-axis direction) may be less than in a virtual layout in standard cells are randomly placed and routed.

Standard cells used to generate the actual layout 600 may be standard cells whose layout is modified/supplemented based on a verification result of a mask corresponding to a virtual layout. Accordingly, a possibility of occurrence of issues during processes of applying optical proximity correction to the actual layout 600, preparing the mask data, and the like, may be reduced. In addition, the optical proximity correction may be omitted or significantly reduced during a process of generating mask data depending on the actual layout 600 to improve process efficiency.

An optical proximity correction model, applied to the actual layout 600, may also be a model corrected/complemented in advance based on the verification result of the mask corresponding to the virtual layout. Thus, the possibility of the occurrence of issues in a process of applying the optical proximity correction to the actual layout 600 and preparing the mask data may be reduced.

In some example embodiments, an optical proximity correction model, verified using a virtual layout in which standard cells are placed in significantly more various combinations than in the actual layout 600, may be used. Thus, an optical proximity correction model, optimized for each region in which an optical proximity effect is expected to significantly emerge in the actual layout 600, may be used to improve reliability of the optical proximity correction.

For example, in the actual layout 600, a fourth standard cell and a sixth standard cell may be sequentially arranged adjacent to each other in the first direction. In the virtual layout 400A according to the example embodiment illustrated in FIG. 8, the fourth standard cell and the sixth standard cell may also be arranged adjacent to each other in the first direction. Thus, optical proximity correction may be performed on a region of the actual layout 600, in which the fourth standard cell and the sixth standard cell are adjacent to each other, using an optical proximity correction model applied to a region of the virtual layout 400A in which the fourth standard cell and the sixth standard cell are adjacent to each other.

Similarly, regions, in which a seventh standard cell and a second standard cell are adjacent to each other in the first direction, may emerge in the actual layout 600 and the virtual layout 400A. Thus, optical proximity correction may be performed on a region of the actual layout 600, in which the seventh standard cell and the second standard cell are adjacent to each other, using an optical proximity correction model applied to a region of the virtual layout 400A in which the standard cell and the second standard cell are adjacent to each other. Since a pre-verified optical proximity correction model may be applied to the actual layout 600 in consideration of placing order and shape of the standard cells, modification of an optical production may be significantly reduced after the mask data is generated. As a result, process efficiency may be improved.

Figure 13:
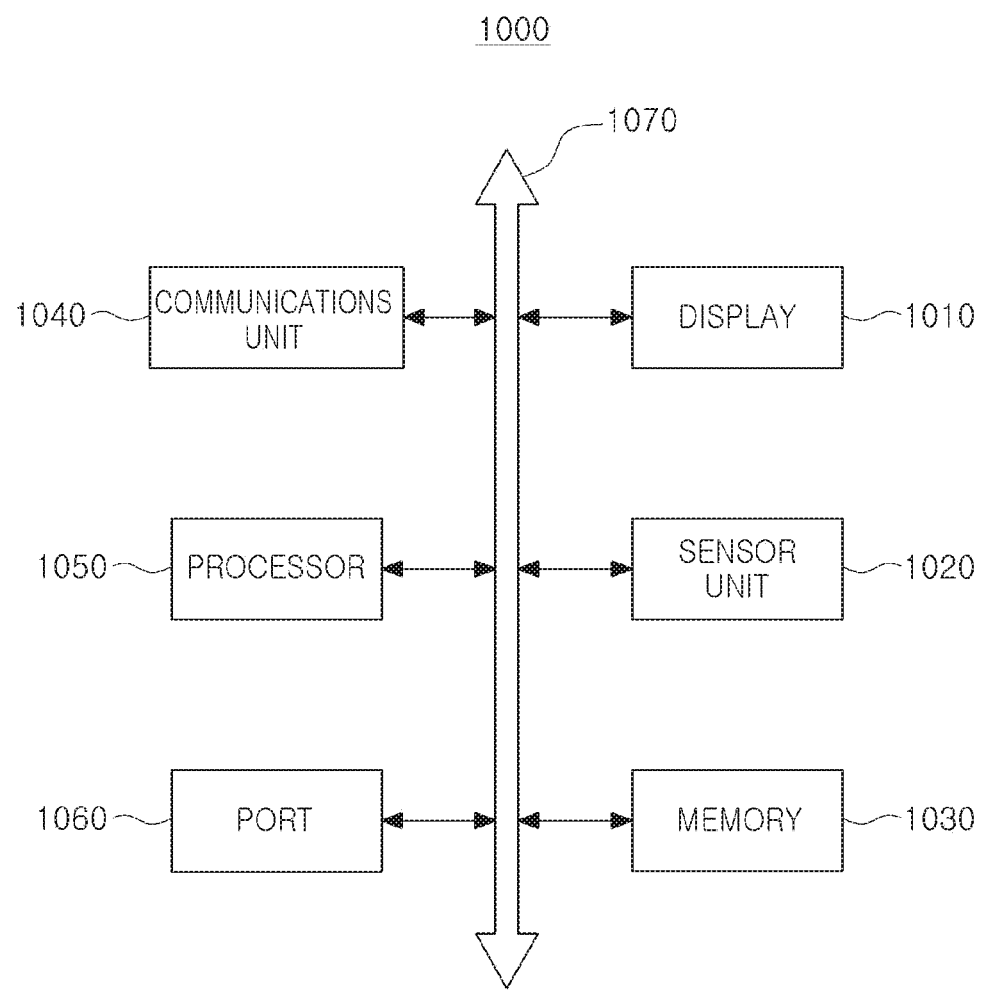
FIG. 13 is a block diagram of an electronic device including a semiconductor device manufactured by methods according to some example embodiments.

FIG. 13 is a block diagram of an electronic device including a semiconductor device manufactured by a method according to some example embodiments.

An electronic device 1000 according to some example embodiments illustrated in FIG. 13 may include a display 1010, a sensor unit 1020, a memory 1030, a communications unit 1040, a processor 1050, a port 1060, and the like. The electronic device 1000 may further include a power supply, an input/output device, and the like. Among the components illustrated in FIG. 13, the port 1060 may be a device provided for the electronic device 1000 to communicate with a video card, a sound card, a memory card, a universal serial bus (USB) device, and the like. The electronic device 1000 may be a comprehensive device such as a smartphone, a tablet personal computer (PC), a smart wearable device, a general desktop PC, or a laptop PC, as examples.

The processor 1050 may execute a certain operation or a command, a task, and the like. The processor 1050 may be a central processing unit (CPU), a microprocessor unit (MCU), a system on chip (SoC), or the like, and may communicate with the display 1010, the sensor unit 1020, the memory 1030, the communications unit 1040, and other devices connected to the port 1060, via a bus 1070. The sensor unit 1020 may include various sensors configured to collect peripheral information and may include, for example, an acoustic sensor, an image sensor, a GPS sensor, and the like.

The memory 1030 may be a storage medium configured to store data necessary for the operation of the electronic device 1000, or multimedia data. The memory 1030 may include a volatile memory such as a random access memory (RAM) or a nonvolatile memory such as a flash memory. In addition, the memory 1030 may include at least one of a solid state drive (SSD), a hard disk drive (HDD), and an optical disk drive (ODD), as a storage device.

In the electronic device 1000 according to the example embodiment illustrated in FIG. 13, the display 1010, the sensor unit 1020, the memory 1030, the communications unit 1040, the processor 1050, and the like, may include various semiconductor devices. In a process of producing the semiconductor devices, standard cells having a layout modified/supplemented using a virtual layout, an optical proximity correction model, and the like, may be applied as described above with reference to FIGS. 1 to 12. Thus, productivity may be improved by significantly reducing time delay caused by modification of an optical proximity model and/or modification of a layout of a semiconductor device during mask data preparation in the process of producing semiconductor devices. Moreover, since semiconductor devices may be produced using standard cells having a pre-optimized layout and an optical proximity correction model appropriate to various cases, process yield, reliability, and the like, may be improved.

As described above, standard cells may be randomly placed and routed to generate a virtual layout, and optical proximity correction may be performed on the virtual layout to generate virtual mask data. A mask may be verified based on the virtual mask data to modify/supplement an optical proximity correction model and/or a layout of the standard cells. Accordingly, standard cells and an optical proximity correction model, optimized for various design rules, may be provided to provide a method of manufacturing a semiconductor device having improved productivity and yield.

While some example embodiments have been shown and described above, it will be apparent to those skilled in the art that modifications and variations could be made without departing from the scope of the present inventive concepts as defined by the appended claims.

What is claimed is:

1. A method of manufacturing a semiconductor device, the method comprising:
    randomly placing a plurality of standard cells from a library in which the standard cells are pre-stored;
    designing an interconnection pattern in which the standard cells are connected randomly to each other;
    connecting the standard cells according to the interconnection pattern to generate a virtual layout;
    performing an optical proximity correction operation on the virtual layout using an optical proximity correction (OPC) model; and
    forming and verifying a mask corresponding to the virtual layout on which the optical proximity correction operation is performed,
    wherein the designing the interconnection pattern comprises:
        arranging power supply lines and signal lines, extending in a first direction, in a second direction intersecting the first direction, and
        separating the power supply lines and the signal lines in a plurality of randomly determined cut locations, to form the interconnection pattern.

2. The method of claim 1, wherein the standard cells comprise an active region, a gate electrode, a contact connected to the active region and the gate electrode, a via connected to the contact, and a lower interconnection connected to the via.

3. The method of claim 2, wherein the interconnection pattern and the lower interconnection are connected to each other to generate the virtual layout.

4. The method of claim 1, wherein verifying the mask corresponding to the virtual layout comprises at least one of simulating a photolithography process using the mask corresponding to the virtual layout to virtually verify the mask corresponding to the virtual layout, and/or performing a photolithography process on a wafer using the mask corresponding to the virtual layout to verify a pattern formed on the wafer.

5. The method of claim 1, further comprising:
    modifying the optical proximity correction model based on a verification result of the mask corresponding to the virtual layout.

6. The method of claim 5, comprising:
    placing and routing at least a portion of the standard cells based on a design rule to generate an actual layout of an integrated circuit (IC) block;
    performing an optical proximity correction operation on the actual layout using the optical proximity correction model; and
    forming a mask corresponding to the actual layout on which the optical proximity correction operation is performed.

7. The method of claim 6, wherein a number of combinations of standard cells adjacent to each other in the virtual layout is greater than a number of combinations of standard cells adjacent to each other in the actual layout.

8. The method of claim 6, wherein the virtual layout and the actual layout have the same area.

9. The method of claim 1, further comprising:
    modifying at least one layout among layouts of the standard cells based on a verification result of the mask corresponding to the virtual layout.

10. A method of manufacturing a semiconductor device, the method comprising:
    randomly placing and routing standard cells to generate a virtual layout corresponding to a virtual integrated circuit (IC) block;
    performing an optical proximity correction on the virtual layout using an optical proximity correction model;
    modifying at least one of the optical proximity correction model and/or a layout of one of the randomly placed and routed standard cells based on a verification result of a mask corresponding to the virtual layout;

placing and routing at least a portion of the standard cells based on a design rule to generate an actual layout corresponding to an IC block;

performing an optical proximity correction on the actual layout using the optical proximity correction model;

forming a mask corresponding to the actual layout on which the optical proximity correction is performed; and performing a semiconductor process on a wafer using the mask corresponding to the actual layout, wherein each of the virtual layout and the actual layout comprises power supply lines and signal lines extending in a first direction and arranged in a second direction intersecting the first direction, and wherein the power supply lines included in the actual layout, and the power supply lines included in the actual layout, are arranged in the same location in the second direction as in the virtual layout.

11. The method of claim 10, wherein a plurality of virtual layouts, in which the standard cells are placed and routed in different manners to each other, are generated and wherein optical proximity correction is performed on each of the virtual layouts to form masks.

12. The method of claim 10, wherein the optical proximity correction on the actual layout is performed with reference to the optical proximity correction model for an area of the virtual layout in which placing and routing of the standard cells included in the actual layout emerge.

13. The method of claim 10, wherein the randomly placed and routed standard cells are stored in a library, and wherein the virtual layout comprises all of the standard cells stored in the library.

14. The method of claim 10, wherein a number of combinations of standard cells adjacent to each other in the first direction or the second direction in the virtual layout, is greater than a number of combinations of standard cells adjacent to each other in the first direction or the second direction in the actual layout.

15. The method of claim 10, wherein a location and a size of an interconnection included in at least one layout among layouts of the standard cells are both modified.

16. The method of claim 10, wherein a parameter applied to the semiconductor process is adjusted based on the verification result.

17. The method of claim 10, wherein the design rule is modified using the verification result.

18. A method of manufacturing a semiconductor device, the method comprising:

randomly placing and routing all standard cells stored in a standard cell library to generate a virtual layout in which the standard cells are placed and connected, resulting in M combinations of standard cells adjacent to each other, where M is a natural number;

verifying mask data generated from the virtual layout to modify at least one layout among layouts of the standard cells;

placing and routing at least a portion of the standard cells based on a design rule to generate an actual layout in which the standard cells are placed and connected, resulting in N combinations of standard cells adjacent to each other, wherein N is a natural number less than M; and forming a mask corresponding to the actual layout to perform a semiconductor process, wherein an interconnection pattern of the virtual layout is generated by arranging power supply lines and signal lines, extending in a first direction, in a second direction intersecting the first direction, and separating the power supply lines and the signal lines in a plurality of randomly determined cut locations, to form the interconnection pattern.

* * * * *